US009250091B2

(12) United States Patent
Fino

(10) Patent No.: US 9,250,091 B2
(45) Date of Patent: *Feb. 2, 2016

(54) ROUTING BASED ON DETECTED STOPS

(71) Applicant: Apple Inc., Cupertino, CA (US)

(72) Inventor: Jorge S. Fino, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/338,265

(22) Filed: Jul. 22, 2014

(65) Prior Publication Data

US 2014/0336913 A1    Nov. 13, 2014

Related U.S. Application Data

(63) Continuation of application No. 13/669,934, filed on Nov. 6, 2012, now Pat. No. 8,793,062.

(51) Int. Cl.
*G01C 21/34* (2006.01)
*G08G 1/01* (2006.01)
*G08G 1/0968* (2006.01)
*G06Q 50/06* (2012.01)

(52) U.S. Cl.
CPC .............. *G01C 21/34* (2013.01); *G08G 1/0112* (2013.01); *G08G 1/0129* (2013.01); *G08G 1/0141* (2013.01); *G08G 1/096811* (2013.01); *G08G 1/096844* (2013.01); *G06Q 50/06* (2013.01); *G08G 1/096827* (2013.01); *G08G 1/096888* (2013.01)

(58) Field of Classification Search
CPC ............... G08G 1/096811; G08G 1/096827; G08G 1/096888; G06Q 50/06
USPC ........... 701/1, 117; 301/1, 468, 532; 340/436, 340/439, 479, 905, 907, 908, 993; 40/610, 40/612; 362/503; 187/387; 180/65.25; 903/916
See application file for complete search history.

(56) References Cited

U.S. PATENT DOCUMENTS

| | | | | |
|---|---|---|---|---|
| 3,725,787 A * | 4/1973 | Featherston | ................. | 375/211 |
| 5,659,545 A * | 8/1997 | Sowles et al. | ................. | 370/324 |
| 5,835,008 A | 11/1998 | Colemere, Jr. | | |
| 5,862,244 A * | 1/1999 | Kleiner et al. | ................. | 382/104 |
| 5,917,431 A | 6/1999 | Sanada et al. | | |
| 6,243,644 B1 | 6/2001 | Dengler | | |
| 6,405,132 B1 | 6/2002 | Breed et al. | | |
| 6,714,636 B1 | 3/2004 | Baiyor et al. | | |
| 7,912,628 B2 | 3/2011 | Chapman et al. | | |
| 8,090,524 B2 | 1/2012 | Chapman et al. | | |
| 8,483,940 B2 | 7/2013 | Chapman et al. | | |
| 2010/0070128 A1 | 3/2010 | Johnson | | |
| 2012/0158299 A1 | 6/2012 | Cerecke et al. | | |
| 2013/0110392 A1 | 5/2013 | Kosseifi et al. | | |

* cited by examiner

*Primary Examiner* — McDieunel Marc
(74) *Attorney, Agent, or Firm* — Fish & Richardson P.C.

(57) ABSTRACT

In some implementations, a mobile device can transmit traffic information to a server for analysis. The traffic information can include movement information including detected stops and durations of detected stops. The traffic information is analyzed to detect traffic patterns that indicate locations of stop signs or stop lights or both. The traffic information can be analyzed to determine durations of stops at stop signs or stop lights or both. The durations of stops can be associated with a time of day or day of the week or both. In some implementations, navigational routes can be determined based stop sign or stop light information or both, including the delays attributable to detected stop signs or stop lights or both.

21 Claims, 9 Drawing Sheets

ROUTING BASED ON DETECTED STOPS

CROSS-REFERENCE TO RELATED APPLICATION

This application is a continuation of and claims priority to U.S. patent application Ser. No. 13/669,934, entitled "Routing Based on Detected Stops," filed Nov. 6, 2012, the entire contents of which are incorporated herein by reference.

TECHNICAL FIELD

The disclosure generally relates to navigation and routing.

BACKGROUND

Modern mobile devices often include navigational hardware and software to aid users when travelling from one location to another. A user can input a destination and the mobile device can present one or more routes from a start location to a destination location. Often route information will include the distance from the start location to the destination location. Sometimes the route information will include an estimate of the amount of time that it will take to travel from the current location to the destination location based on distance and speed. The user may select which route to take based on the distance or estimated time. However, the estimated time may be inaccurate due to traffic conditions that may not be known and/or included in the time estimate.

SUMMARY

In some implementations, a mobile device can transmit traffic information to a server for analysis. The traffic information can include movement information including detected stops and durations of detected stops. The traffic information can be analyzed to detect traffic patterns that indicate locations of stop signs and/or stop lights. The traffic information can be analyzed to determine durations of stops at stop signs and/or stop lights. The durations of stops can be associated with a time of day and/or day of the week. In some implementations, navigational routes can be determined based stop sign and/or stop light information, including the delays attributable to detected stop signs and/or stop lights.

Particular implementations provide at least the following advantages: More accurate travel time estimates can be calculated when stop sign/stop light information is included in route determinations. Better or faster routes can be determined when stop sign/stop light information is included in the route determination. A best time to travel to avoid stops can be determined using stop sign/stop light information.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

This disclosure describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from, or providing feedback to a user.

Collecting Traffic Information

Figure 1:
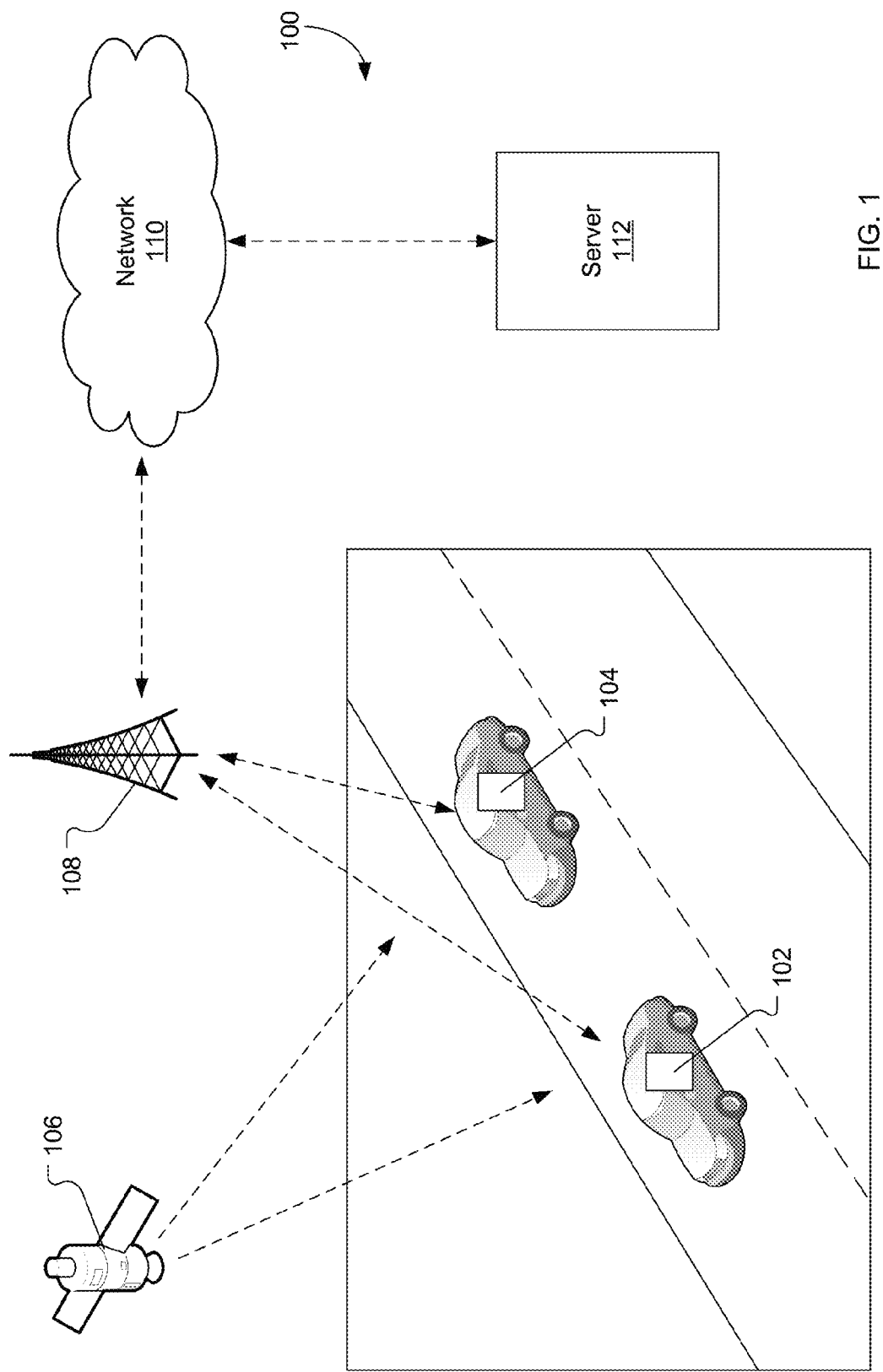
FIG. 1 is an example system for collecting and analyzing traffic information.

FIG. 1 is an example system 100 for collecting and analyzing traffic information. In some implementations, system 100 can include mobile device 102 and/or mobile device 104. For example, mobile device 104 can have similar capabilities as mobile device 102, described below.

In some implementations, mobile device 102 can include sensors, software and/or hardware for determining or tracking the location of mobile device 102. For example, mobile device 102 can include a global navigation satellite system (GNSS) receiver for determining the location of mobile device 102. Mobile device 102 can receive satellite signals from one or more GNSS satellites 106 and determine the location of mobile device 102 based on the satellite signals according to known methods. Mobile device 102 can include cellular and/or WiFi transceivers for receiving and transmitting cellular and/or WiFi signals. The cellular and/or WiFi signals can be used to determine a location for mobile device 102 based on known locations for the cellular or WiFi transmitters 108 that are transmitting the cellular or WiFi signals. For example, mobile device 102 can use triangulation or location averaging to determine the location of mobile device 102 based on the cellular and/or WiFi signals.

In some implementations, mobile device can be configured with motion sensors to determine when mobile device 102 is moving or stopped. For example, mobile device 102 can be configured with an accelerometer, a gyroscope or any other motion sensor capable of detecting the movement of mobile device 102.

In some implementations, mobile device 102 can be configured to determine and track the location of mobile device 102 as mobile device 102 moves. For example, if mobile device 102 is in a moving vehicle, mobile device 102 can track the location of the vehicle as the vehicle moves. The location information (i.e., traffic information) can include GNSS data and/or motion sensor data. For example, the motion sensor data can be used to determine when mobile device 102 is moving or stopped. The motion sensor data along with the mobile device's internal clock can be used to determine how long (e.g., duration) the mobile device is moving or stopped. The sensor data can be correlated to GNSS data to determine locations corresponding to the stops. For example, the GNSS location information can be associated with a time. The motion sensor data can be associated with a time. The GNSS location information and the motion sensor data can be correlated based on time to determine a location and duration of a stop.

In some implementations, mobile device 102 can transmit or report the traffic information to server 112 (e.g., navigation server) over network 110 (e.g., the internet). For example, mobile device 102 can connect to network 110 through cellular (or WiFi) transmitter (or wireless access point) 108. In some implementations, the traffic information collected from mobile device 102 (and collected from mobile device 104) can be used to determine traffic patterns associated with stop signs and stop lights as the mobile device moves on various roadways. For example, server 112 can collect traffic information from many mobile devices, correlate the traffic information based on location and time, for example, and determine the locations and durations of stops at stop signs and stop lights based on the traffic patterns observed in the collected traffic information.

In some implementations, the traffic information can be reported to server 112 in real-time or near real-time. In some implementations, the traffic information can be stored on mobile device 102 and reported to server 112 at a later time. For example, mobile device 102 may not be connected to network 110 when the traffic information is collected. Thus, mobile device 102 can store the traffic information to an internal storage device and report the traffic information to server 112 when mobile device 102 later establishes a connection with network 110 (e.g., when mobile device 102 later establishes a connection to a WiFi access point).

In some implementations, server 112 can determine routes based on stop sign and/or stop light information. For example, once server 112 has determined locations and delays associated with detected stop signs and/or stop lights, server 112 can use the location and delay information to suggest routes to users. For example, a user of mobile device 102 may request a route from a first location (e.g., Point A) to a second location (e.g., Point B). Typically, server 112 can determine one or more routes from Point A to Point B based on distance and/or duration (e.g., travel time). For example, a user can often indicate in a route request whether the user wants the shortest distance to the destination or the quickest time to the destination. If the user wants the quickest time to the destination (e.g., shortest trip duration), then the server can estimate the travel time from Point A to Point B by multiplying the distance between Point A and Point B by a known speed limit or average speed for the roads connecting Point A and Point B. However, when surface streets (e.g., non-highway roads) are involved, a time estimate based only on distance and speed can be inaccurate due to stops (e.g., delays) necessitated by stop signs and stop lights. Thus, in some implementations, server 112 can identify locations of stop signs and/or stop lights, determine average lengths of time (e.g., delays) for stops at stop signs and stop lights, and include the delay time attributed to stop signs and stop lights to the travel time estimate to generate a more accurate trip time estimate.

In some implementations, once server 112 determines routes based on stop sign and stop light information, server 112 can transmit the determined routes and/or stop sign and stop light information to mobile device 102 for presentation to the user.

Detecting Stop Signs

Figure 2:
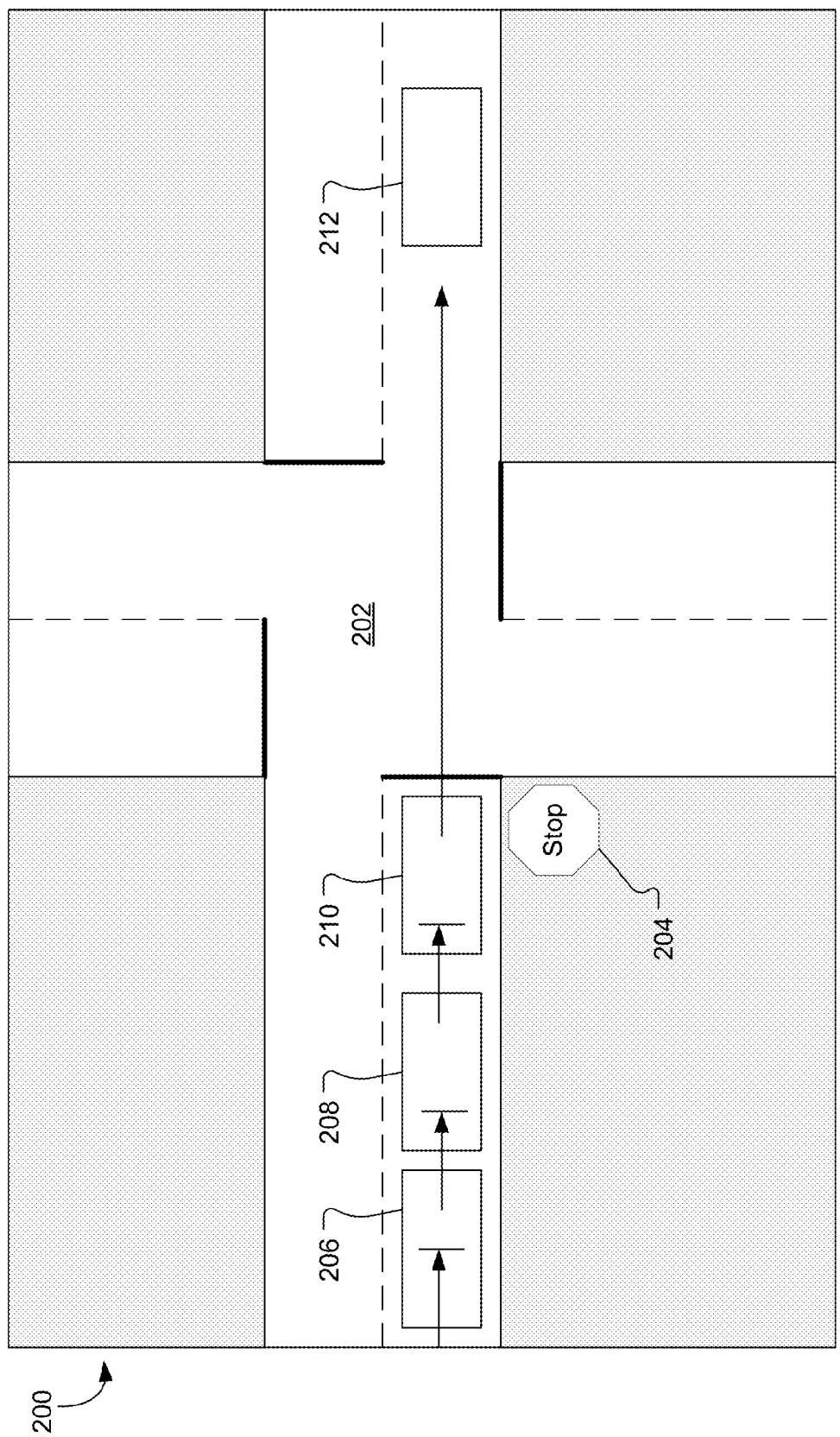
FIG. 2 is an illustration of traffic patterns associated with a stop sign.

FIG. 2 is an illustration 200 of traffic patterns associated with a stop sign. For example, a mobile device (e.g., mobile device 102 or 104) carried within a vehicle can detect, record and/or report movement of the vehicle so that traffic patterns associated with a stop sign can be detected and used for navigational purposes, as described herein. For example, illustration 200 depicts an intersection 202 having a stop sign 204. As vehicles 206, 208 and/or 210 approach stop sign 204, each vehicle will momentarily stop at the stop sign and then drive off, like vehicle 212. If there is more than one vehicle queued (e.g., vehicles 206, 208 and 210) at stop sign 204, each vehicle will proceed in a stop and go fashion toward the stop sign. Once vehicles 206, 208 and 210 stop at the location of the stop sign, each vehicle will drive off, like vehicle 212. Thus, a stop sign can be characterized by a pattern of movement (e.g., traffic pattern) that includes stops of short durations (e.g., less than a threshold period of time) alternating with movements of short distance (e.g., less than a threshold distance) and ending with movement of a longer distance (e.g., greater than a threshold distance) and/or duration (e.g., greater than a threshold period of time).

In some implementations, stop sign approach thresholds and stop sign departure thresholds can be used to determine a pattern of movement (e.g., traffic pattern) associated with a stop sign. For example, two approach thresholds can be defined for a stop sign pattern of movement: 1) the stop duration threshold and 2) the movement distance threshold. These approach thresholds can be used to identify movement of a mobile device in advance of the location of a stop sign. The stop duration threshold can be a short period of time (e.g., three seconds). The movement distance threshold can be a short distance (e.g., two car lengths). In some implementations, the stop duration threshold and the movement distance threshold can be used for identifying the stop-and-go movement of a vehicle approaching a stop sign. Similarly, two departure thresholds can be defined for a stop sign pattern of movement: 1) the drive off distance threshold and 2) the drive off duration threshold. These departure thresholds can be used independently or in combination to determine when the mobile device has left the location of a stop sign. For example, the location of the stop sign can be identified as the location of the last stop before the movement exceeding the drive off distance threshold and/or the drive off duration threshold.

In some implementations, the location of stop sign 204 can be identified when mobile device 102 detects a single stop of a short duration (e.g., stop duration threshold, 3 seconds) at a location and followed by movement for more than a threshold duration (e.g., drive off duration threshold, ten seconds) and/or more than a threshold distance (e.g., drive off distance threshold, greater than fifty feet). For example, a single car approaching a stop sign will stop briefly (e.g., less than the stop duration threshold) at the stop sign and then drive off. The location of the single brief stop can be identified as a location of the stop sign.

In some implementations, the location of stop sign 204 can be identified when mobile device 102 detects two or more stops of a short duration (e.g., less than the stop duration threshold) where the stops are less than a threshold distance (e.g., less than the stop distance threshold) apart and followed by movement for more than a threshold duration (e.g., drive off duration threshold) and/or more than a threshold distance (e.g., drive off distance threshold, greater than fifty feet). For example, the location of the stop sign can be identified as the location of the last stop before the movement that exceeds the drive off duration threshold and/or drive off distance threshold.

In some implementations, the accuracy of the stop sign location determination can be improved by collecting and correlating traffic information from many mobile devices (e.g., mobile devices 102 and 104). For example, if the traffic patterns attributable to a stop sign at a particular location are detected in traffic information received from multiple mobile devices, then there is a high probability that a stop sign does in fact exist at the determined location. However, if just one or two devices report traffic information that includes a stop sign pattern of movement for a location, then the system can identify the pattern of movement as an anomaly attributable, perhaps, to an unusual road condition, or unusual behavior of the driver of the vehicle.

Detecting Stop Lights

Figure 3:
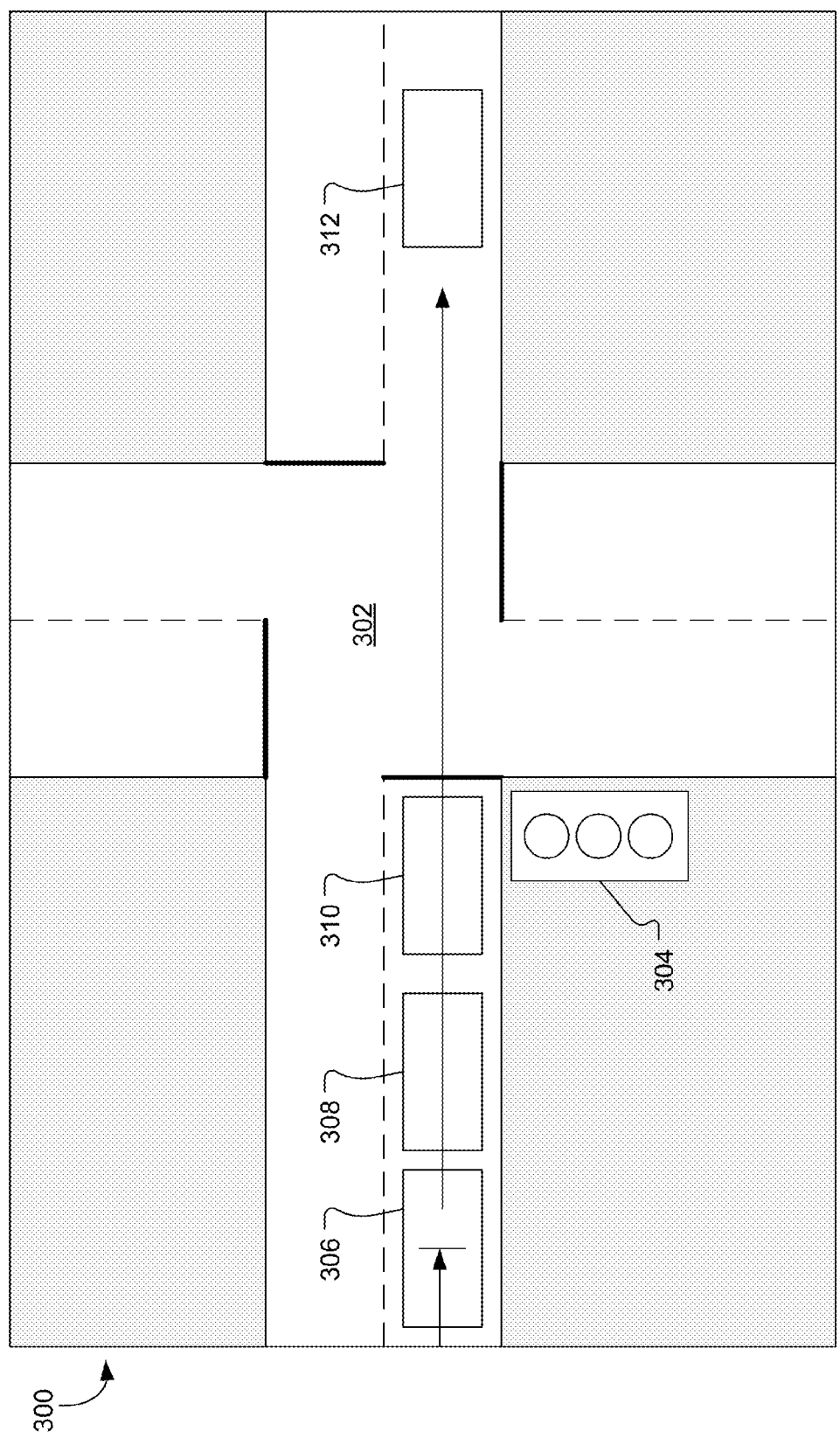
FIG. 3 is an illustration of traffic patterns associated with a stop light.

FIG. 3 is an illustration 300 of traffic patterns associated with a stop light. For example, a mobile device (e.g., mobile device 102 or 104) carried within a vehicle can detect, record and/or report movement of the vehicle so that traffic patterns associated with a stop light can be detected and used for navigational purposes, as described herein. For example, illustration 300 depicts an intersection 302 having a stop light 304. As vehicles 306, 308 and/or 310 approach stop light 304, each vehicle will stop at the stop light for the duration of the stop light and then drive off (e.g., vehicle 312). If there is more than one vehicle queued (e.g., vehicles 306, 308 and/or 310) at stop light 304, each vehicle will wait until the stop light indicates that the vehicles can proceed through intersection 302 (e.g., stop light turns green). In contrast to a stop sign, vehicles queued at a stop light do not proceed in a stop and go fashion toward the stop light and through the intersection. Instead, vehicles queued at the stop light will stop together and then proceed together through the intersection as a group once the stop light indicates that the vehicles can proceed through the intersection. Thus, a stop light pattern of movement (e.g., traffic pattern) can be characterized as a single stop proximate to an intersection and exceeding a stop light duration threshold followed by a movement exceeding a stop light movement threshold through the intersection. For example, vehicle 306 may be queued at stop light 304 but may not be at intersection 302 because vehicles 308 and 310 are in front of vehicle 306 but because vehicle 306 is queued near intersection 302, vehicle 306 is considered to be proximate to intersection 302.

In some implementations, the location of stop light 304 can be determined based on traffic information received from multiple mobile devices. For example, if vehicles 306, 308 and 310 are queued (e.g., stopped) at a stop light, each vehicle will have a different location associated with the stop detected by the mobile device. The location of the stop of an individual vehicle (e.g., vehicle 306) may not indicate the location of stop sign 304. However, when the traffic information received from mobile devices associated with vehicles 306, 308 and 310 is correlated and analyzed as a whole, the server can determine that the location of the stop associated with vehicle 310 is the correct location of stop light 304.

In some implementations, the location of the stop light can be determined based on the detected stop nearest an intersection. For example, if vehicles 306, 308 and 310 are stopped and queued at stop light 304 (e.g., intersection 302), then the mobile device associated with each vehicle can report traffic information to the server indicating the respective location where the vehicle is stopped. Additionally, the server can obtain map information indicating the locations of highways, roads and intersections. For example, the map information can be stored on the server or downloaded from a map server. The server can compare the vehicle stop locations to intersection location information to determine vehicle stop locations that are near intersection locations. The server can then identify the location of a stop light to be the location of an intersection proximate (e.g., within a threshold distance, within one car length) to the vehicle stops. Alternatively, the server can identify the location of the stop light to be the location of the vehicle stop nearest (e.g., within a threshold distance) of an intersection location.

In some implementations, traffic patterns attributable to stop signs and/or stop lights can be detected based on a threshold number of mobile devices reporting the stop sign and/or stop light traffic patterns. For example, when approaching a stop sign, some vehicles may make stops that are longer than the above described stop sign approach thresholds. When approaching a stop light, some vehicles may make stops that are less than the stop light duration threshold. However, when taken as a whole, most mobile devices may report stop durations and movement distances that are consistent with the stop sign/stop light traffic patterns, described above. Thus, in some implementations, a stop sign and/or stop light traffic pattern can be detected when a threshold percentage (e.g., greater than 60%) of mobile devices report traffic patterns consistent with stop sign and/or stop light locations, as described above.

Detecting Problems with Stop Lights

In some implementations, stop light malfunctions can be determined based on a stop sign traffic pattern. For example, a stop light location can be determined as described above. When a stop light malfunctions, often the traffic patterns approaching the malfunctioning stop light will appear to be a stop sign traffic pattern. Thus, in some implementations, when a stop sign traffic pattern is detected at a known stop light location, a stop light malfunction can be detected.

Presenting Stop Information

In some implementations, the server can transmit stop sign and/or stop light information to a mobile device for presentation on the display of the mobile device. For example, the server can collect traffic information from multiple devices, correlate and analyze the traffic information to identify traffic patterns attributable to stop signs and stop lights, as described above, and identify the locations of the stop signs and stop lights based on the locations corresponding to the identified traffic patterns. Additionally, the server can use the reported traffic information to determine how much time vehicles spend at a stop sign and/or stop light.

In some implementations, when a mobile device reports traffic information to the server, the server can determine how long it took the vehicle associated with the mobile device to get through (e.g., how long the vehicle was delayed at) a stop sign. For example, when a stop sign pattern of movement is detected in a mobile device's reported traffic information, the server can add up the duration of each stop associated with the stop sign to determine how much time is spent navigating through the stop sign. The summation of the stop durations can be the delay attributable to the stop sign.

In some implementations, when a mobile device reports traffic information to the server, the server can determine how long it took the vehicle associated with the mobile device to get through a stop light. For example, when a stop light pattern of movement is detected in a mobile device's reported traffic information, the server can use the duration of the stop (or stops) at the stop light to determine the delay attributable to the stop light.

In some implementations, the delay attributable to a stop sign and/or stop light can be averaged. For example, the server can average the delay across multiple vehicles (multiple mobile devices). The average delay for a stop sign/stop light can be the average of all vehicles, the average for a particular day of the week and/or the average for a particular time of day. For example, the traffic information reported by a mobile device can be associated with a time of day when the movement, stop, location, traffic pattern, etc. was detected by the mobile device. The server can correlate traffic information across mobile devices based on time of day to determine average delays attributable to a stop sign/stop light at a time of day. For example, a user can request to view stop sign/stop light information for a time of day (e.g., 5:00 pm) and the server can average the delays attributable for stop signs/stop lights within a window (e.g., +/−5 minutes, 4:55 pm-5:05 pm) that includes the requested time. The server can send the stop sign/stop light information (e.g., in addition to other traffic information) to the mobile device for presentation on a display of the mobile device.

Figure 4:
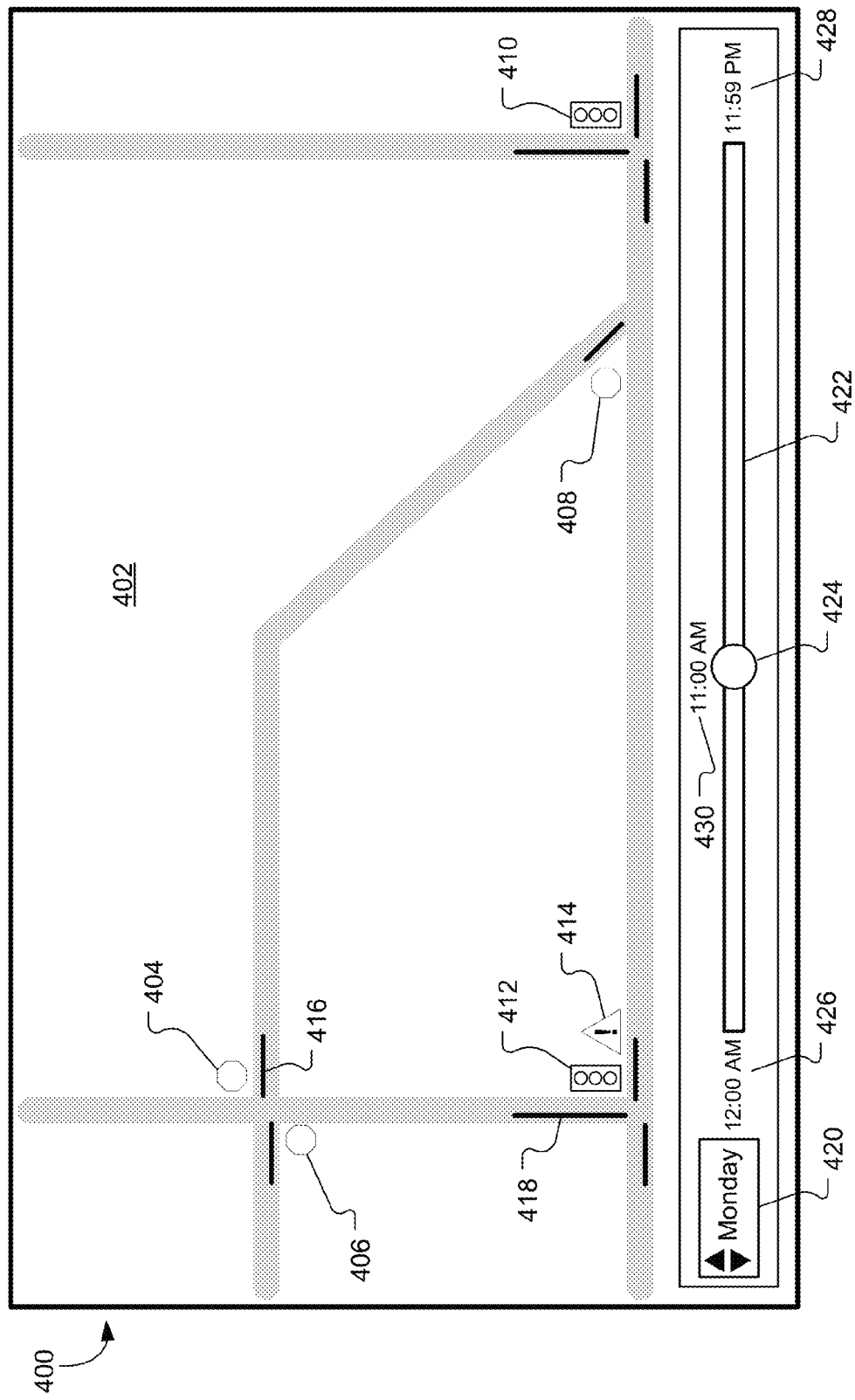
FIG. 4 is an example graphical user interface for presenting stop sign/stop light information.

FIG. 4 is an example graphical user interface 400 for presenting stop sign/stop light information. In some implementations, graphical user interface 400 can present a map 402 of a geographic area. For example, the user can specify a location and the mobile device can present a geographic area that includes the location on graphical user interface 400. The user can provide input (e.g., touch input) to scroll map 402 to cause different geographic areas to be presented in graphical user interface 400, for example. In some implementations, the geographic area presented on graphical interface 400 can correspond to a route requested by the user. For example, the user can enter a start location and a destination location and the mobile device can present a map representing a geographic area that includes the one or more routes. The user can then provide input requesting the mobile device to display stop sign/stop light information, as illustrated by FIG. 4.

In some implementations, graphical user interface 400 can present locations of stop signs and stop lights on map 402. For example, graphical objects 404-408 can represent locations of stop signs as determined by the stop sign traffic patterns described above with reference to FIG. 2. Graphical objects 410-412 can represent locations of stop lights as determined by the stop light traffic patterns described above with reference to FIG. 3. In some implementations, when the server has detected a problem with stop light 412, graphical object 414 can be displayed to indicate that stop light 412 is malfunctioning. A stop light malfunction can be detected based on real-time traffic information reported by mobile devices, as described above, for example. Once the real-time traffic information (e.g., reported traffic patterns) indicates that the stop light is functioning normally again, graphical object 414 can be removed from the map display. In some implementations, a stop light malfunction can be indicated by modifying graphical object 412 (e.g., the stop light icon). For example, instead of displaying graphical object 414 (e.g., the warning icon), graphical object 412 can be made to blink, flash or change color to indicate a problem with the corresponding stop light.

In some implementations, graphical user interface 400 can present graphical objects 416 and 418 to present traffic information related to stop sign/stop light locations 404-412. For example, graphical objects 416 and 418 can be lines having lengths and/or colors representing delays attributable to stop sign 404 and stop light 412, respectively. In some implementations, a green, yellow, red color scheme can be used to represent the amount of delay attributable to a stop sign or stop light. Green can be displayed when the delay is less than a threshold value (e.g., less than 30 seconds). Red can be displayed when the delay is greater than a threshold value (e.g., greater than five minutes). Yellow can be displayed when the delay is between the green and yellow threshold values. In some implementations, the length or size of graphical objects 416 and 418 can represent the amount of delay attributable to a stop sign 404 or stop light 412. For example, the longer (or larger) that graphical objects 416-418, the longer the delay attributable to the corresponding stop sign or stop light.

In some implementations, graphical user interface 400 can present stop light and/or stop sign information for a user-selected time of day. For example, a user can specify a time of day (e.g., 9:00 AM on a Monday) and graphical user interface 400 can present graphical objects 416 and 418 representing (e.g., average) stop sign/stop light information for the specified time of day or a time period (e.g., window) including the specified time of day.

In some implementations, graphical user interface 400 can present interactive graphical objects for specifying a time of day for which stop sign/stop light information should be presented. In some implementations, graphical user interface 400 can present graphical object 420 for specifying a day of the week. For example, graphical object 420 can be a pull down menu that lists the days of the week (e.g., Monday-Sunday) and/or a range of days (e.g., All, Weekdays, Weekends, etc.). For example, the user can select "Monday" to view average stop sign/stop light information (e.g., durations, delays, etc.) for Mondays.

In some implementations, graphical user interface 400 can present graphical objects 422 and 424 for specifying a time of day for which stop sign/stop light information should be presented. For example, graphical object 422 can be a slider bar and graphical object 424 can be the slider handle. A user can select and drag graphical object 424 along graphical object 422 to adjust the time of day for which stop sign/stop light information is presented. For example, the far left end of graphical object 422 can correspond to 12:00 AM, as represented on graphical user interface 400 by graphical object 426. The far right end of graphical object 422 can correspond to 11:59 PM, as represented on graphical user interface 400 by graphical object 428. The user can select and drag graphical object 424 left and right along graphical object 422 to adjust the time of day between 12:00 AM and 11:59 PM. For example, the user can select and drag graphical object 424 so that the stop sign/stop light information corresponds to 11:00 AM, as represented on graphical user interface 400 by graphical object 430.

In some implementations, a user can view stop light/stop sign information for a particular time of day of a particular day of the week. For example, the user can interact with graphical object 420 to select a day of the week or range of days and interact with graphical objects 422 and 424 to select a time of day. Thus, a user can view stop sign/stop light information for a particular time of a particular day of the week. Allowing the user to view stop sign/stop light information in this manner can allow the user to plan ahead and choose a more efficient time of day and/or route to travel.

Suggesting a Departure Time

Figure 5:
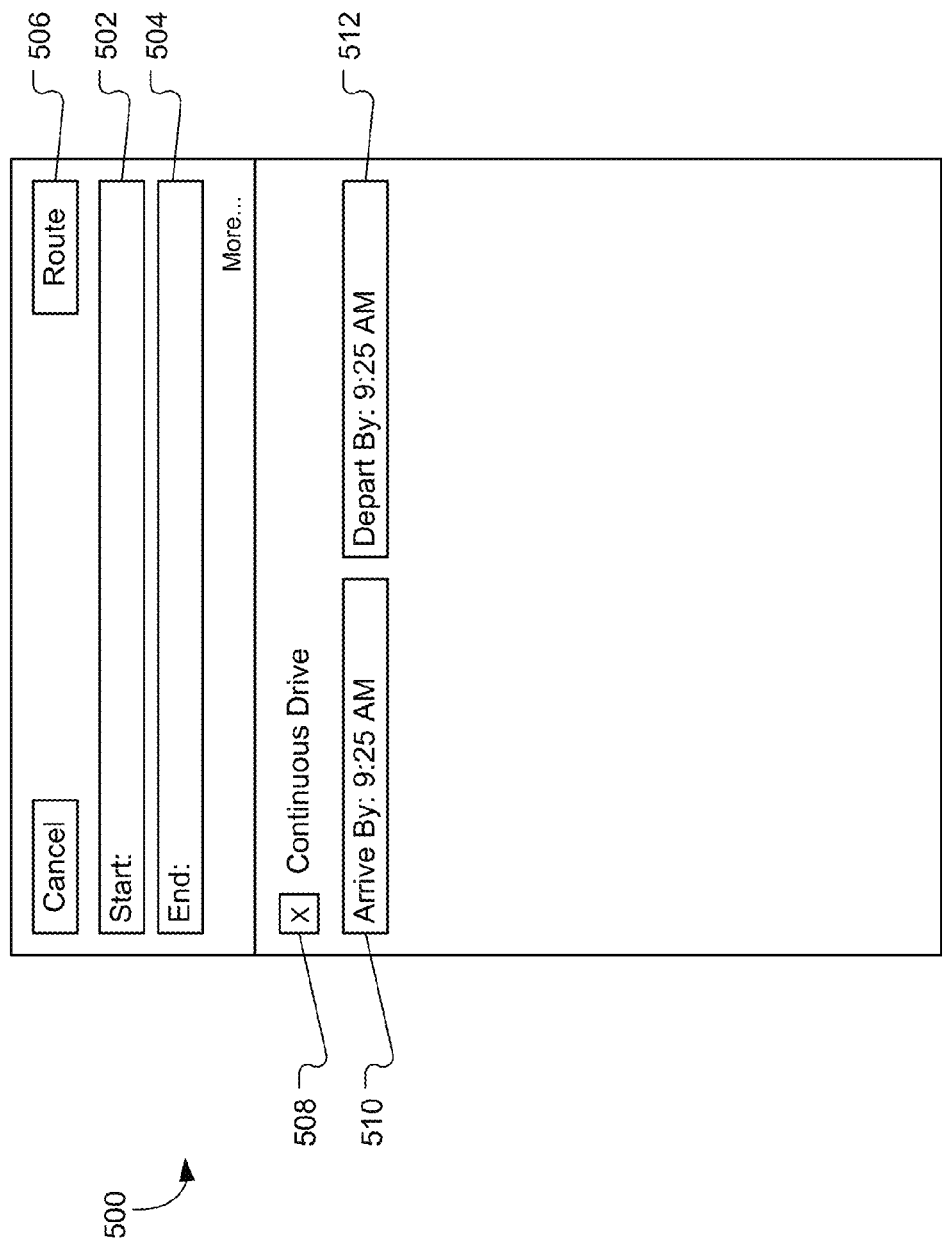
FIG. 5 is an example user interface for receiving routing parameters.

FIG. 5 is an example user interface 500 for receiving routing parameters. For example, graphical user interface 500 can include graphical objects 502 and 504 for specifying a start location (502) and a destination location (504) for a route. The start location and the destination location can be transmitted to the server when the user selects graphical object 506. The server can determine routes between the start location 502 and the destination location 504.

In some implementations, the server can determine routes based on delays attributable to stop signs and/or stop lights along a route. For example, the server can determine the amount of time that it will take to traverse various routes between start location 502 and destination location 504 based on distance and speed. In some implementations, the server can determine the amount of time it will take to traverse various routes between start location 502 and destination 504 based on collected traffic information. For example, when the mobile devices report traffic information (e.g., location, time, stops, etc.) to the server, the server can use the location and time information in the traffic information to determine the average amount of time it takes to traverse various routes or route segments between the start location and the destination location. The server can add in the delays attributable to the stop signs and/or stop lights along each route as determined according to the techniques described above. The server can determine which route takes less time based on the distance, speed and stop sign/stop light delays for each route and prioritize the routes or make a route recommendation to the user according to which route takes less time.

In some implementations, the server can suggest a departure time based on stop sign and/or stop light traffic information. For example, a user can select continuous drive option 508 and enter an arrival time 510 for a destination 504 to have the server can suggest a departure time 512 that will result in a trip with fewest or shortest stops. For example, the server can analyze traffic patterns associated with stop signs and/or stop lights to determine when (e.g., what time of day) stops (e.g., delays) at stop signs and/or stop lights are shortest. The server can analyze the traffic patterns attributable to stop lights to determine when (e.g., what time of day) stop lights turn green and allow traffic through an intersection. The server can determine, based on the analysis of the stop sign and stop light traffic patterns, a departure time for a route between the start location 502 and the destination location 504 that will result in the fewest or shortest stops. For example, the server can predict, based on departure time, distance, speed and stop sign/stop light delays, when the user will encounter each stop sign and stop light along a route. The server can then suggest a departure time so that the user encounters the shortest stops at stop signs and stop lights and/or green lights at stop lights. For example, if the user departs the start location at the suggested departure time, the user may experience a continuous or near-continuous drive to the destination location.

Example Processes

Figure 6A:
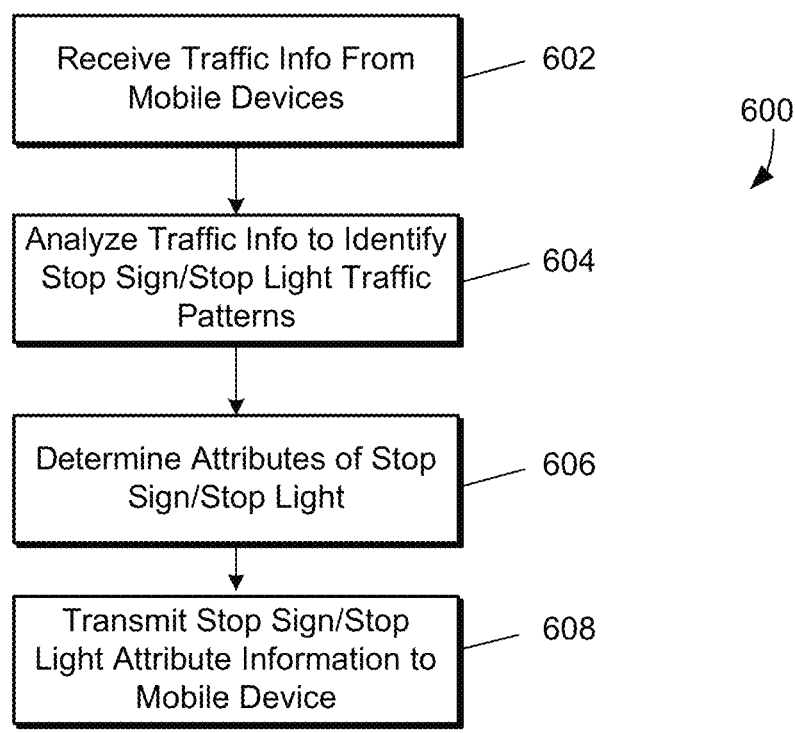
FIG. 6A is flow diagram of an example process for stop sign/stop light determination.

FIG. 6A is flow diagram of an example process 600 for stop sign/stop light determination. At step 602, a server can receive traffic information from mobile devices. For example, traffic information can be crowd sourced from many mobile devices. The mobile devices can collect traffic information (e.g., location, movement and time information), as described above, and report the traffic information to the server for analysis.

At step 604, the server can analyze the traffic information to identify stop sign and/or stop light traffic patterns. For example, the server can analyze the traffic information for patterns of movement attributable to stop signs and stop lights, as described above with reference to FIGS. 2 and 3.

At step 606, the server can determine attributes of stop signs and stop signs based on the traffic patterns. For example, the server can determine, based on the identified stop sign/stop light traffic patterns, the locations of stop signs and stop lights. The server can determine delays attributable to stop signs and stop lights. The server can determine schedules associated with stop signs and stop lights (e.g., amount of delay per time of day, when stop lights are green, when stop lights are red).

At step 608, the server can transmit the stop sign/stop light attribute information to a mobile device. For example, the mobile device can request stop sign/stop light attribute information for a geographic area from the server and the server can transmit the stop sign/stop light attribute information to the mobile device for presentation to a user.

Figure 6B:
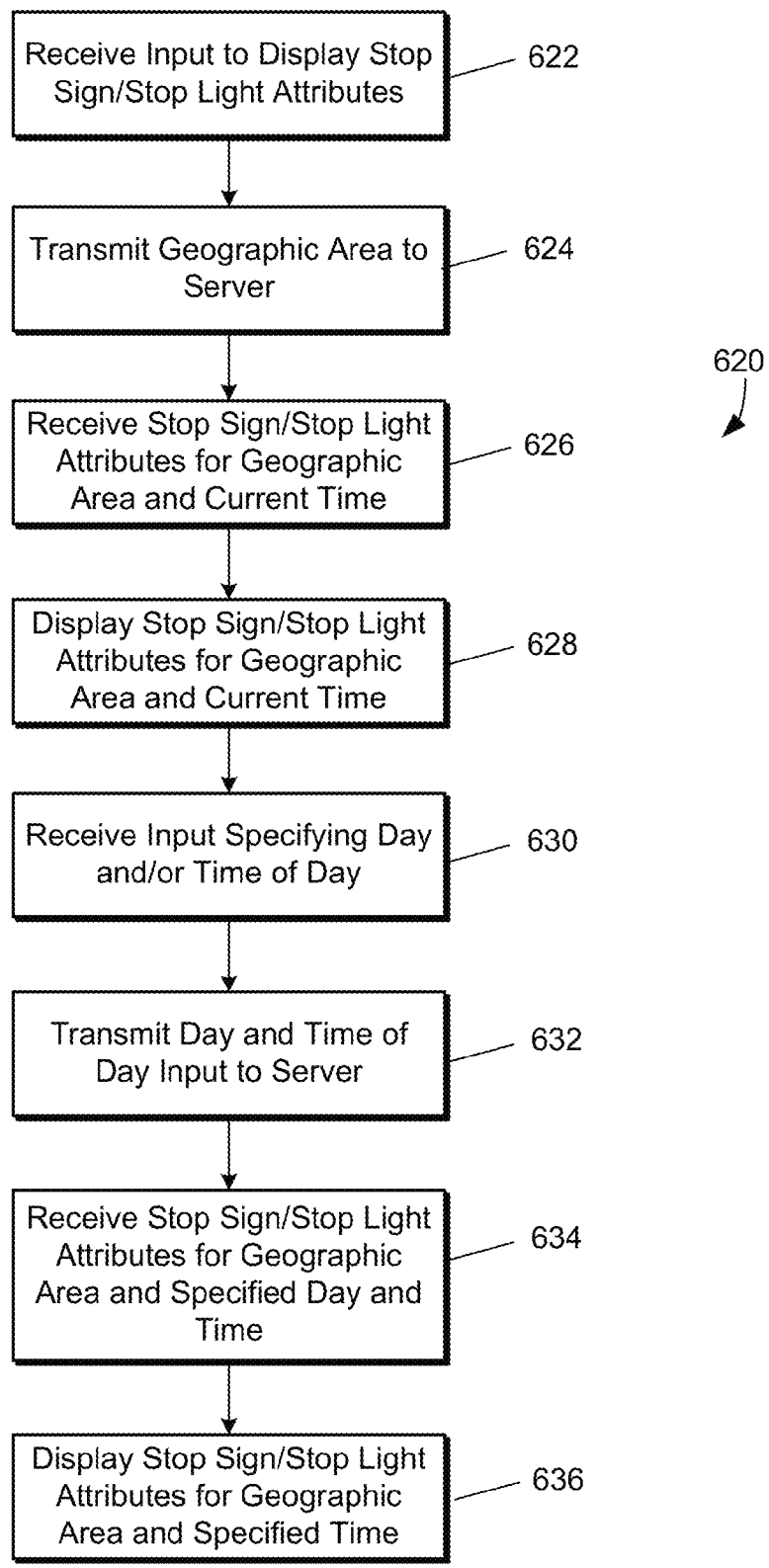
FIG. 6B is a flow diagram of an example process for displaying stop sign/stop light information.

FIG. 6B is a flow diagram of an example process 620 for displaying stop sign/stop light information. At step 622, user input to display stop sign/stop light attributes can be received by a mobile device. For example, a user viewing a map or navigation application on the mobile device can select an option to view stop sign and stop light attributes for a geographic area.

At step 624, the geographic area can be transmitted to a server. For example, the server can collect and correlate traffic information, as described above, and determine attributes (e.g., locations, delays, schedules, etc.) for stop signs and/or stop lights for the geographic area.

At step 626, the mobile device can receive stop sign/stop light attributes for the geographic area and current time. For example, the server can determine stop sign/stop light attributes for the geographic area and the current day and time. The server can transmit the stop sign/stop light attributes to the mobile device.

At step 628, the mobile device can display the stop sign/stop light attributes for the geographic area and current time. For example, the mobile device can display the stop sign/stop light attributes as described above with reference to FIG. 4.

At step 630, the mobile device can receive input specifying a day and/or time of day. For example, the mobile device can receive user input specifying a day and/or time of day as described above with reference to FIG. 4.

At step 632, the mobile device can transmit the user-specified day and/or time of day to the server. For example, the server can determine stop sign/stop light attributes for the user specified day and time of day and transmit the stop sign/stop light attributes to the mobile device for presentation to the user. Thus, the mobile device can receive the stop sign/stop light attributes for the geographic area and the user specified time of day, at step 634.

At step 636, the mobile device can display the stop sign/stop light attributes for the geographic area and the specified day and time of day. For example, the mobile device can display the stop sign/stop light attributes as described above with reference to FIG. 4.

In some implementations, the server can transmit stop sign/stop light attributes information for many geographic areas and for many days and times of day. For example, the server can transmit stop sign/stop light attribute information to the mobile device for the current geographic location of the mobile device and the geographic locations surrounding the current geographic location of the mobile device. The server can transmit stop sign/stop light attribute information for all days and all times of day. The mobile device can store the stop sign/stop light attribute information and determine stop sign/stop light information for a geographic area and time of day based on the stored information without having to request the information from the server when a user provides new geographic area, day and/or time of day input.

In some implementations, the mobile device can periodically request updated stop sign/stop light information. For example, the mobile device can request stop light/stop sign attribute information from the server once a month, every other month, or every six months.

In some implementations, the server can push new stop sign/stop light attribute information to the mobile device when a real-time update is required. For example, when the server detects a stop light malfunction, the server can push the stop light malfunction information to the mobile device so that the mobile device can present the stop light malfunction to the user, as described above with reference to FIG. 4.

Figure 6C:
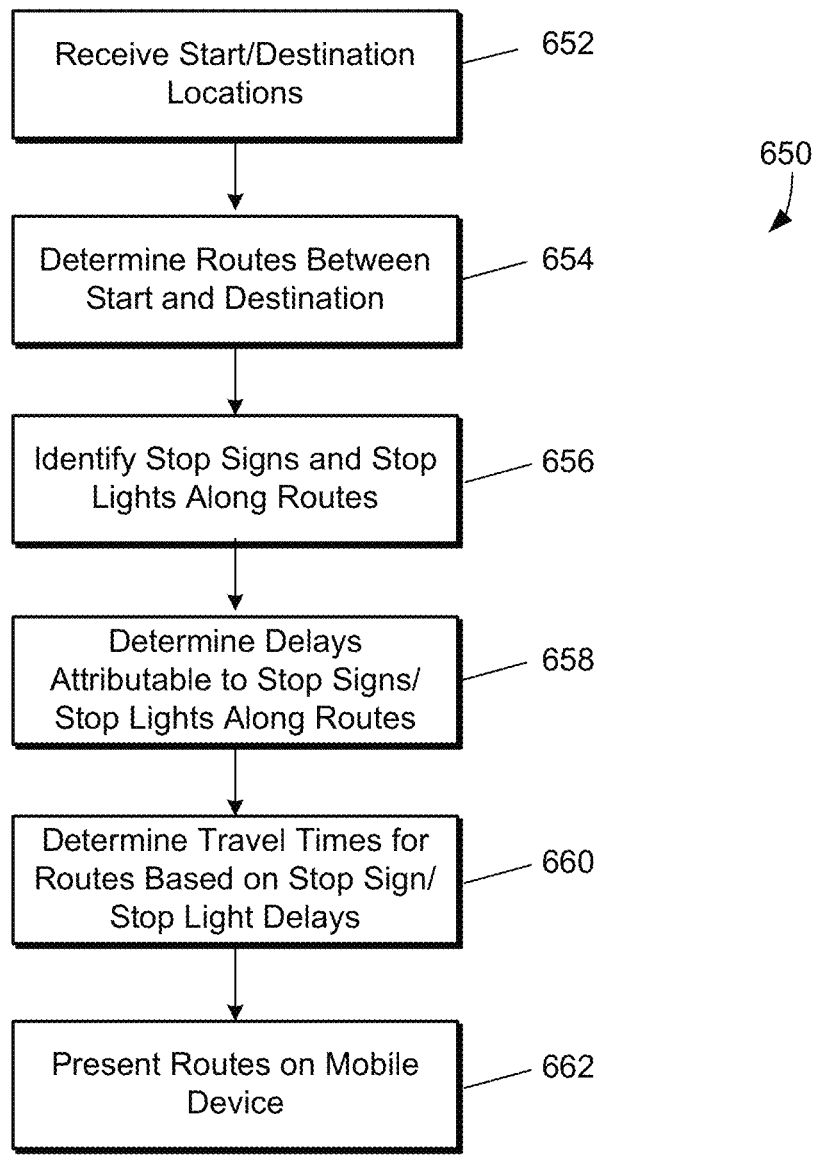
FIG. 6C is a flow diagram of an example process for route determination based on stop sign/stop light information.

FIG. 6C is a flow diagram of an example process 650 for route determination based on stop sign/stop light information. At step 652, a start location and a destination location can be received. For example, the mobile device can receive user input specifying a start location and a destination location for a route. The start location can be the current location of the mobile device. The current location can be automatically determined by the mobile device. In some implementations, a server can perform the route determination. For example, if a server is performing the route determination, the start location and destination location can be transmitted to the server. In some implementations, a mobile device can perform the route determination. For example, if the mobile device is performing the route determination, the server can transmit the navigation information necessary for performing the route determination, including the stop sign/stop light attribute information, to the mobile device, as described above. The mobile device can store the navigation information and use the navigation information to perform the route determination according to the following steps.

At step 654, routes between the start location and the destination location can be determined. For example, the server or mobile device can determine the three or four shortest routes between the start location and destination location. The server or mobile device can determine the three or four fastest routes between the start location and the destination location based on travel times calculated based on distance and road speed.

At step 656, stop signs and/or stop lights along the determined routes can be identified. For example, the server or mobile device can use the stop sign/stop light attributes determined according to process 600 to identify stop signs and/or stop lights located along the determined routes.

At step 658, delays attributable to stop signs and/or stop lights along the determined routes can be determined. For example, the server or mobile device can use the stop sign/stop light attributes determined according to process 600 to determine the delays attributable to stop signs and/or stop lights located along the determined routes.

At step 660, the travel times for routes based on the stop sign and/or stop light delays can be determined. For example, the server or mobile device can add the delays attributable to the stop signs and/or stop lights along the determined routes to the travel times calculated based on distance and speed for each route to determine which route has the shortest travel times.

At step 662, the routes determined based on stop sign/stop light information can be presented on the mobile device. For example, if the server determined the routes, the server can transmit the routes to the mobile device. The mobile device can present the routes according to fewest stops, shortest trip time or shortest distance, for example.

Example System Architecture

Figure 7:
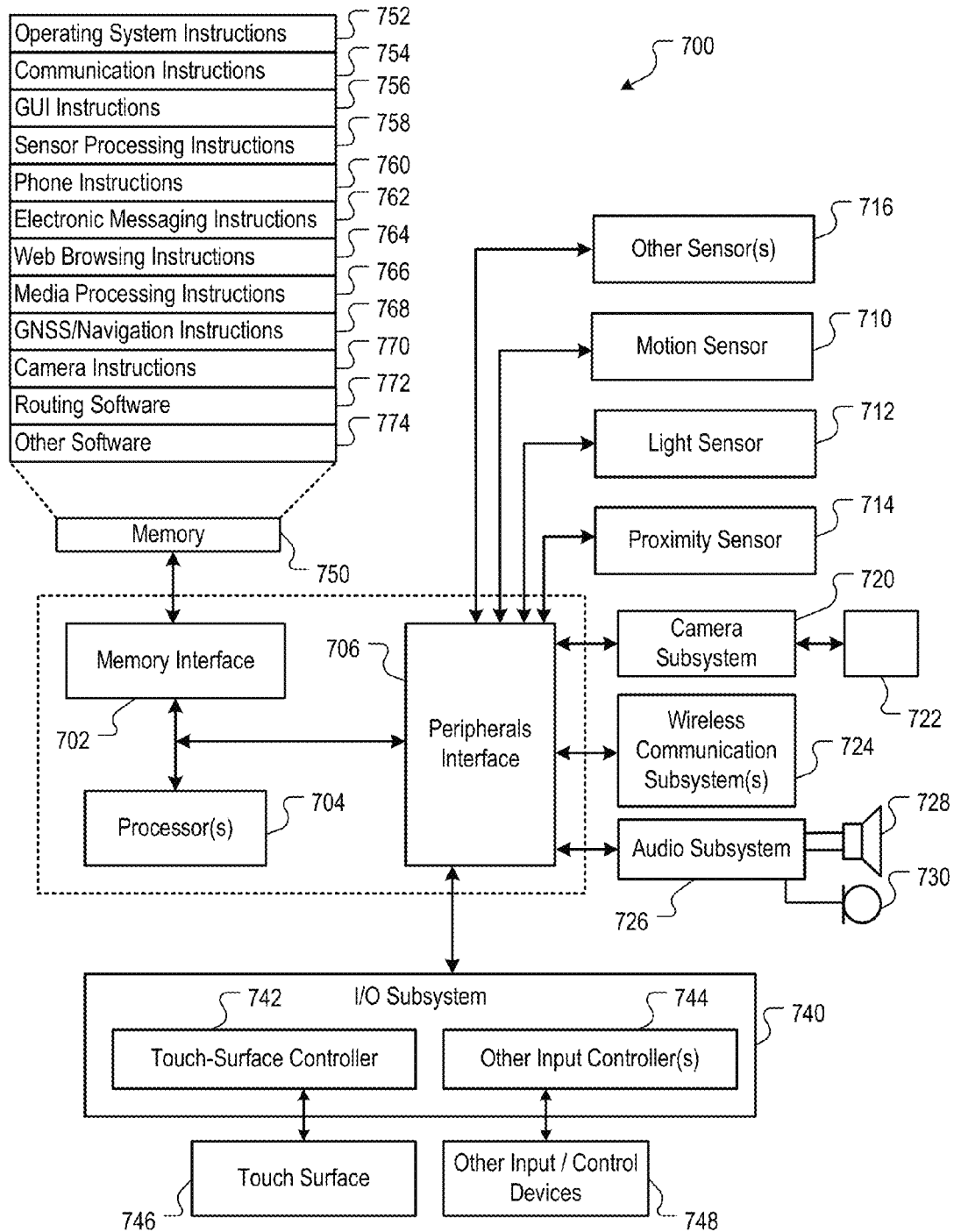
FIG. 7 is a block diagram of an exemplary system architecture implementing the features and processes of FIGS. 1-6C.

FIG. 7 is a block diagram of an example computing device 700 that can implement the features and processes of FIGS. 1-6C. The computing device 700 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the computing device 700 can be coupled by one or more communication buses or signal lines.

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate orientation, lighting, and proximity functions. Other sensors 716 can also be connected to the peripherals interface 706, such as a global navigation satellite system (GNSS) (e.g., GPS receiver), a temperature sensor, a biometric sensor, or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the computing device 700 is intended to operate. For example, the computing device 700 can include communication subsystems 724 designed to operate over a GSM network, a GPRS network, an EDGE network, a Wi-Fi or WiMax network, and a Bluetooth™ network. In particular, the wireless communication subsystems 724 can include hosting protocols such that the device 100 can be configured as a base station for other wireless devices.

An audio subsystem 726 can be coupled to a speaker 728 and a microphone 730 to facilitate voice-enabled functions, such as speaker recognition, voice replication, digital recording, and telephony functions. The audio subsystem 726 can be configured to facilitate processing voice commands, voice-printing and voice authentication.

The I/O subsystem 740 can include a touch-surface controller 742 and/or other input controller(s) 744. The touch-surface controller 742 can be coupled to a touch surface 746. The touch surface 746 and touch-surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration can disengage a lock of the touch surface 746; and a pressing of the button for a second duration that is longer than the first duration can turn power to the computing device 700 on or off. Pressing the button for a third duration can activate a voice control, or voice command, module that enables the user to speak commands into the microphone 730 to cause the device to execute the spoken command. The user can customize a functionality of one or more of the buttons. The touch surface 746 can, for example, also be used to implement virtual or soft buttons and/or a keyboard.

In some implementations, the computing device 700 can present recorded audio and/or video files, such as MP3, AAC, and MPEG files. In some implementations, the computing device 700 can include the functionality of an MP3 player, such as an iPod™. The computing device 700 can, therefore, include a 36-pin connector that is compatible with the iPod. Other input/output and control devices can also be used.

The memory interface 702 can be coupled to memory 750. The memory 750 can include high-speed random access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks.

The operating system 752 can include instructions for handling basic system services and for performing hardware dependent tasks. In some implementations, the operating system 752 can be a kernel (e.g., UNIX kernel). In some implementations, the operating system 752 can include instructions for performing voice authentication. For example, operating system 752 can implement the location tracking features as described with reference to FIGS. 1-6C.

The memory 750 can also store communication instructions 754 to facilitate communicating with one or more additional devices, one or more computers and/or one or more servers. The memory 750 can include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Navigation instructions 768 to facilitate GNSS and navigation-related processes and instructions; and/or camera instructions 770 to facilitate camera-related processes and functions. The memory 750 can store navigation and/or routing software instructions 772 to facilitate the location tracking, navigation and routing processes and functions described with reference to FIGS. 1-6C.

The memory 750 can also store other software instructions 774, such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the computing device 700 can be implemented in hardware and/or in software, including in one or more signal processing and/or application specific integrated circuits.

What is claimed is:

1. A method comprising:
on a computing device:
receiving a start location and a destination location;
determining routes between the start location and the destination location;
identifying stop signs and stop lights along the determined routes;
determining delays attributable to stop signs or stop lights along the determined routes;
determining travel times for routes based on the delays attributable to stop signs or stop lights along the determined routes; and
presenting at least one of the routes determined based on the stop sign and stop light information.

2. The method of claim 1 comprising receiving user input specifying a start location and a destination location for a route.

3. The method of claim 1 comprising adding the delays attributable to the stop signs or stop lights along the determined routes to the travel times calculated based on distance and speed for each route to determine which route has the shortest travel times.

4. The method of claim 1 wherein identifying stop signs and stop lights along the determined routes comprises receiving information describing attributes of the stop signs and stop lights.

5. The method of claim 4 wherein the attributes of the stop signs and stop lights are determined based on:
receiving traffic information;
analyzing the traffic information to identify traffic patterns attributable to stop signs or stop lights; and
determining attributes of stop signs and stop lights based on the traffic information and the identified stop sign traffic patterns and stop light traffic patterns.

6. The method of claim 5 wherein the determined attributes include locations of stop signs or stop lights.

7. The method of claim 5 wherein the delays attributable to stop signs and stop lights along the determined routes are determined based on the determined attributes of the stop signs and stop lights.

8. A non-transitory computer-readable medium including one or more sequences of instructions which, when executed by one or more processors, causes operations comprising:
receiving a start location and a destination location;
determining routes between the start location and the destination location;
identifying stop signs and stop lights along the determined routes;
determining delays attributable to stop signs or stop lights along the determined routes;
determining travel times for routes based on the delays attributable to stop signs or stop lights along the determined routes; and presenting at least one of the routes determined based on the stop sign and stop light information.

9. The computer-readable medium of claim 8, the operations comprising receiving user input specifying a start location and a destination location for a route.

10. The computer-readable medium of claim 8, the operations comprising adding the delays attributable to the stop signs or stop lights along the determined routes to the travel times calculated based on distance and speed for each route to determine which route has the shortest travel times.

11. The computer-readable medium of claim 8 wherein identifying stop signs and stop lights along the determined routes comprises receiving information describing attributes of the stop signs and stop lights.

12. The computer-readable medium of claim 11 wherein the attributes of the stop signs and stop lights are determined based on:
   receiving traffic information;
   analyzing the traffic information to identify traffic patterns attributable to stop signs or stop lights; and
   determining attributes of stop signs and stop lights based on the traffic information and the identified stop sign traffic patterns and stop light traffic patterns.

13. The computer-readable medium of claim 12 wherein the determined attributes include locations of stop signs or stop lights.

14. The computer-readable medium of claim 12 wherein the delays attributable to stop signs and stop lights along the determined routes are determined based on the determined attributes of the stop signs and stop lights.

15. A system comprising:
   one or more processors; and
   a computer-readable medium including one or more sequences of instructions which, when executed by one or more processors, causes operations comprising:
   receiving a start location and a destination location;
   determining routes between the start location and the destination location;
   identifying stop signs and stop lights along the determined routes;
   determining delays attributable to stop signs or stop lights along the determined routes;
   determining travel times for routes based on the delays attributable to stop signs or stop lights along the determined routes; and
   presenting at least one of the routes determined based on the stop sign and stop light information.

16. The system of claim 15, the operations comprising receiving user input specifying a start location and a destination location for a route.

17. The system of claim 15, the operations comprising adding the delays attributable to the stop signs or stop lights along the determined routes to the travel times calculated based on distance and speed for each route to determine which route has the shortest travel times.

18. The system of claim 15 wherein identifying stop signs and stop lights along the determined routes comprises receiving information describing attributes of the stop signs and stop lights.

19. The system of claim 18 wherein the attributes of the stop signs and stop lights are determined based on:
   receiving traffic information;
   analyzing the traffic information to identify traffic patterns attributable to stop signs or stop lights; and
   determining attributes of stop signs and stop lights based on the traffic information and the identified stop sign traffic patterns and stop light traffic patterns.

20. The system of claim 19 wherein the determined attributes include locations of stop signs or stop lights.

21. The system of claim 19 wherein the delays attributable to stop signs and stop lights along the determined routes are determined based on the determined attributes of the stop signs and stop lights.

* * * * *